United States Patent
Rosenthal (10) Patent No.: US 11,939,275 B2
(45) Date of Patent: *Mar. 26, 2024

(54) BIODEGRADABLE POLYMERS ON FERTILIZER NUTRIENTS

(71) Applicant: PROFILE PRODUCTS LLC, Buffalo Grove, IL (US)

(72) Inventor: Edward Rosenthal, Sarasota, FL (US)

(73) Assignee: Profile Products LLC, Buffalo Grove, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/733,252

(22) Filed: Apr. 29, 2022

(65) Prior Publication Data

US 2022/0259117 A1 Aug. 18, 2022

Related U.S. Application Data

(63) Continuation of application No. 16/987,887, filed on Aug. 7, 2020, now Pat. No. 11,339,102.

(60) Provisional application No. 62/884,237, filed on Aug. 8, 2019.

(51) Int. Cl.
C05G 5/35 (2020.01)
C05G 3/40 (2020.01)
C05G 5/30 (2020.01)
C05G 5/40 (2020.01)

(52) U.S. Cl.
CPC ............... *C05G 5/38* (2020.02); *C05G 3/40* (2020.02); *C05G 5/37* (2020.02); *C05G 5/40* (2020.02)

(58) Field of Classification Search
None
See application file for complete search history.

(56) References Cited

U.S. PATENT DOCUMENTS

| | | | |
|---|---|---|---|
| 5,147,442 A | 9/1992 | Kosuge et al. | |
| 5,560,768 A | 10/1996 | Gordonov et al. | |
| 5,645,624 A | 7/1997 | Naka et al. | |
| 6,193,775 B1 | 2/2001 | Fujita et al. | |
| 6,500,223 B1 | 12/2002 | Sakai et al. | |
| 7,267,707 B2 | 9/2007 | Rosenthal et al. | |
| 7,320,724 B2 | 1/2008 | Rosenthal | |
| 10,562,827 B1 | 2/2020 | Rosenthal et al. | |
| 11,339,102 B2 * | 5/2022 | Rosenthal | C05G 5/37 |
| 2003/0215657 A1 | 11/2003 | Tijsma et al. | |
| 2015/0239790 A1 | 8/2015 | Iwig et al. | |
| 2018/0022661 A1 | 1/2018 | Achille et al. | |
| 2018/0258005 A1 | 9/2018 | Benmoussa | |
| 2020/0102457 A1 | 4/2020 | Goldstein et al. | |

OTHER PUBLICATIONS

Hu, et al., "Fabrication and mechanical properties of completely biodegradable hemp fiber reinforced polylactic acid composities", Journal of Composite Materials, 2007-journals.sagepub.com; 15 pages.

* cited by examiner

*Primary Examiner* — Wayne A Langel
(74) *Attorney, Agent, or Firm* — BROOKS KUSHMAN P.C.

(57) ABSTRACT

A controlled release fertilizer includes a core including plant nutrient particles and a biodegradable coating composition forming at least one layer surrounding the core, the composition comprising cellulose, the at least one layer being structured as a semi-permeable surface membrane configured to release the plant nutrients from the core in a linear manner.

21 Claims, 2 Drawing Sheets

BIODEGRADABLE POLYMERS ON FERTILIZER NUTRIENTS

CROSS-REFERENCE TO RELATED APPLICATIONS

This application is a continuation of U.S. application Ser. No. 16/987,887 filed Aug. 7, 2020, now U.S. Pat. No. 11,339,102 issued on May 24, 2022, which, in turn, claims the benefit of U.S. provisional application Ser. No. 62/884,237 filed Aug. 8, 2019, the disclosures of which are hereby incorporated in their entirety by reference herein.

TECHNICAL FIELD

This invention relates to the art of fertilizers and, more particularly, to a coated granular fertilizer in which the dissolution rates of water-soluble fertilizer components are controlled by coating or encapsulating a granular fertilizer. The coating for the timed-release fertilizer is derived from plant cellulose extracted from hemp cellulose, sugar cane cellulose, or other plant-based cellulose.

BACKGROUND

Achieving crop fertilization by timing the release or application of fertilizer nutrients is known. Fertilization in the container-grown wholesale plant industry, for example, has been accomplished by methods including:

Multiple applications of granular fertilizer
Overhead liquid application of soluble fertilizers
Incorporating slow release fertilizers into potting soil
Polymer coated fertilizers.

Each of these methods and compositions has associated drawbacks. A description of the drawbacks associated with prior art methods and compositions can be found in U.S. Pat. No. 7,320,724, which is incorporated in its entirety herein.

Encapsulating fertilizers to slowly release nutrient to plants is known. Slow release fertilizers delay the dissolution of the fertilizer substrate. Most slow release fertilizers, however, are not dependable in adverse environmental conditions such as high heat and moisture. Hot and wet conditions can cause slow release fertilizers to flash release, causing damage to both the plant material and the environment.

Prior art methods include encapsulating a fertilizer having a given chemical composition or compound such that the nutrients are released over a period of time. For example, coated urea has been used as a source of time released nitrogen, which is a nutrient that promotes plant height and leaf formation in a plant. U.S. Pat. Nos. 5,147,442, 5,560,768 and 6,500,223 each of which is incorporated in its entirety, illustrate such coated fertilizers and methods associated with them.

A process for producing such particles comprises applying an isocyanate-reactive component comprising a polyether polyol onto fertilizer particles to form coated fertilizer particles, applying an isocyanate component onto said coated fertilizer particles; and forming the polyurethane encapsulated fertilizer particles.

U.S. Pat. No. 7,267,707 82 is drawn to polyurethane encapsulated fertilizer and names Ed. Rosenthal, the inventor herein as an inventor. The '707 patent is directed to a polyurethane encapsulated, slow release fertilizer with a coating based upon an isocyanate component and an isocyanate-reactive component comprising a polyether polyol.

The process for producing the particles of the '707 patent comprises applying an isocyanate-reactive component comprising a polyether polyol onto fertilizer particles to form coated fertilizer particles, applying an isocyanate component onto said coated fertilizer particles; and forming the polyurethane encapsulated fertilizer particles.

One of the important characteristics of the molecular structure of this polyurethane polymer which was patented by Florikan is that the polyurethane is a crosslinked polymer polyol which accurately produces a controlled release of nutrients.

The '707 patent provides a technology which allows for a controlled release fertilizer coating that is thinner than presently available products on the market. Additionally, the new coated fertilizer technology increases the Nitrogen value and provides a more cost-effective cost per unit of Nitrogen, for the grower when applying fertilizer.

The grower is therefore able to use fewer total tons (less cost and environmental burden) to achieve a similar desired result/yield.

The f}F-iGf coated fertilizer of the '707 patent provides a more efficient delivery of nutrients to the crop in that it releases nutrients more linearly over time in tropical conditions compared to competitive products.

The '707 patent invention solves the problem of providing agricultural grower in tropical conditions (such as, for example Florida) with a cost effective and enhanced efficiency form of fertilizer when compared to conventional 'raw' or uncoated granular fertilizer or other polymer coated fertilizers currently on the market.

The '707 patent invention also reduces environmental nitrogen/nutrient loss from volatilization or leaching into ground water and can save growers cost with a more efficient product that allows them to apply less overall material to their crops.

In the prior art the granular fertilizer is coated with a water-resistant film-forming polyurethane composition. The composition comprises an isocyanate-reactive polyol and an isocyanate component, and a second wax coating of a high heat (micro-crystalline) wax prior to final curing of the urethane coating. MDI (4,4 diphenylmethane diisocyanate) is a preferred isocyanate.

The present coated fertilizer can have a coating of up to about 2%.

It is known that plant-based cellulose such as cellulose from hemp is biodegradable.

In the U.S. Pat. No. 10,562,827, issued Feb. 18, 2020, the specification describes a controlled release fertilizer prepared comprising a nutrient core coated with one or more moisture barrier coatings, at least one of said moisture barrier coatings comprising: at least one polyethylene wax; and a thermoset polyurethane from the reaction of a polyol and a polyisocyanate.

The '827 patent discloses controlled release fertilizer comprising a nutrient core coated with one or more moisture barrier coatings, at least one of said moisture barrier coatings-consisting essentially of: at least one polyethylene wax; and a thermoset polyurethane from the reaction of a polyol and a polyisocyanate; wherein the weight ratio of the thermoset polyurethane to polyethylene wax is from about 50:50 to about 98:2, and wherein the polyethylene wax is heated above the melt point of the polyethylene wax and mixed and dispersed into the polyol component of the thermoset polyurethane in a ratio of 90-70% polyol to 10-30% polyethylene wax before the thermoset polyurethane-forming mixture is applied to the surface of the nutrient core and cured, and wherein after the last layer of the polyurethane-forming coating is added onto the surface of the nutrient core particles and is in the later stage of curing, a melted high-melt microcrystalline wax in liquid form is sprayed onto the coated nutrient core particles and the high-melt microcrystalline wax solidifies and hardens upon contact with the coated nutrient particles and rapidly encapsulates the coated fertilizer substrate to form the polyurethane coated particles having an outer layer of solidified microcrystalline wax.

The '827 patent invention utilizes a second wax coating comprising a high heat (micro-crystalline) wax application during the final stages of the curing of the polyurethane to cure on the hot material being cured thus avoiding final cooling step in the process; basically, heating liquid wax to about 190.degree. F. and spraying onto about 160.degree. F. product and curing instantly. A non-limiting example of a high temperature microcrystalline wax useful in the present invention is MICROSERE@ 5890A. MICROSERE@ 5890A is a white, high-melt, microcrystalline wax that is used in a variety of applications. MICROSERE@ 5890A complies with the requirements for "Microcrystalline Wax" set by the United States Pharmacopeia (USP)/National Formulary (NF). MICROSERE@ 5890A has the following properties:

Physical Properties

| TEST METHODS | ASTM METHOD | SPECIFICATIONS | | |
|---|---|---|---|---|
| | | minimum | maximum | TYPICAL |
| Drop Melt Point F° C. | D 127 | 175 79,4 | 188 86.7 | 181 (82.8 |
| Kinematic Viscosity, cSt 212 OF 100° C. | D 445 | 14.0 | — | — |
| Oil Content, wt. % | D 721 | — | 2.0 | = |
| Sa bolt Color | D 6045 | +16 | — | — |
| Odor | D 1833 | — | 2 | 1 |
| Needle Penetration, dmm 77 OF 250 C. | D 1321 | 15 | 22 | 21 |

Note:
Physical properties for which ONLY a typical value is listed are included as additional information but may not be printed on the COA.

The '827 patent invention comprises a controlled release fertilizer comprising a nutrient core coated with one or more moisture barrier coatings, at least one of said moisture barrier coatings comprising: at least one polyethylene wax; and a thermoset polyurethane from the reaction of a polyol and a polyisocyanate. The weight ratio of thermoset polyurethane to polyethylene wax is from about 50:50 to about 98:2, and the polyethylene wax is heated above the melt point of the polyethylene wax and mixed and dispersed into the polyol component of the thermoset polyurethane in a ratio of 90-70% polyol to 10-30% polyethylene wax before the thermoset polyurethane-forming mixture is applied to the surface of the nutrient core and cured. A coating of a high temperature microcrystalline wax which is applied prior to final curing of the thermoset polyurethane to the coated nutrient core particles.

The organic wax disclosed in the '827 patent invention can be at least one selected from the group consisting of petroleum waxes, synthetic waxes, waxes, natural waxes, and hydrogenated triglycerides. The organic wax can be a paraffin. The polyethylene wax useful in the present invention is a waxy solid having a melting point range of between a 55°. and 85°. C. preferably between 60° and 70° C. The polyethylene wax is a LOPE. The polyethylene may contain a wax soluble polymer.

In the '827 patent invention wax soluble polymer can be added to the polyethylene wax which is substantially non-reactive with the said thermoset polymer. The wax soluble polymer can form a homogeneous mixture with the said wax at 100° C. The wax soluble polymer can have a viscosity of less than 10.000 centipoise at 1DO.degree. C. when at least 2 percent by weight is mixed with the said wax. The wax soluble polymer can be at least one selected from the group consisting of ethylene-vinyl acetate copolymers and terpolymers, modified polyolefins, acrylate ester polymers and copolymers, and tackifying resins.

After the last layer of ISO/CS is added and is in the later stage of curing, a high melt microcrystalline wax is added to the product. The high-melt wax starts as a solid. The wax is heated to a temperature of about 200° F. in a melting tank at which points it becomes a liquid. The high-melt microcrystalline wax is then sprayed on to later stage of curing of the polyurethane coated fertilizer substrate. The wax becomes solid again and "set" at about 181°. F. Since the fertilizer bed is about 160-165° F., the wax will rapidly encapsulate the coated fertilizer substrate and harden. Using the high-melt microcrystalline wax allows the product to be released from the coating vessel and put directly into bulk storage bins without going through an additional cooling step that other CRF technologies must go through when being manufactured.

The '827 patent utilizes an additional wax coating comprising of a high heat (micro-crystalline) wax application during the final stages of the curing of the polyurethane to cure on the hot material being cured thus avoiding final cooling step in the process; basically, heating liquid wax to about 190° F. and spraying onto about 160° F. product and curing instantly.

An advantage of the '827 patent invention is that the invention can be focused on specialty agricultural markets and on improving crop yields.

The '827 patent invention wax on polyurethane provides a technology which allows for a controlled release fertilizer coating that is thinner than presently available products on the market. Additionally, the new coated fertilizer technology increases the Nitrogen value and provides a more cost-effective cost per unit of Nitrogen, for the grower when applying fertilizer.

The grower is therefore able to use fewer total tons (less cost and environmental burden) to achieve a similar desired result/yield.

The '827 patent invention coated fertilizer provides a more efficient delivery of nutrients to the crop in that it releases nutrients more linearly over time in tropical conditions compared to competitive products.

The '827 patent invention solves the problem of providing agricultural grower in tropical conditions (such as, for example Florida) with a cost effective and enhanced efficiency form of fertilizer when compared to conventional 'raw' or uncoated granular fertilizer or other polymer coated fertilizers currently on the market.

The '827 patent invention also reduces environmental nitrogen/nutrient loss from volatilization or leaching into ground water and can save growers cost with a more efficient product that allows them to apply less overall material to their crops.

The polymer coated granular fertilizer according to the prior art invention comprises a particulate fertilizer which is coated with a novel resin composition.

The particulate fertilizer used in the present invention is not critical with respect to the type and may be any known chemical fertilizer. Examples of the fertilizer include ammonium sulfate, ammonium chloride, ammonium nitrate, urea, potassium chloride, potassium sulfate, potassium nitrate, sodium nitrate, ammonium phosphate, potassium phosphate, calcium phosphate, and composite fertilizers thereof.

In The '827 patent invention the granular fertilizer is coated with a water-resistant film-forming polyurethane composition. The composition comprises an isocyanate-reactive polyol and an isocyanate component, and a second wax coating of a high heat (micro-crystalline) wax prior to final curing. MDI (4,4 diphenylmethane diisocyanate) is a preferred isocyanate.

The present coated fertilizer can have a coating of up to about 2%. The organic waxes are selected from the group consisting of petroleum waxes, synthetic waxes, waxes, natural waxes, and hydrogenated triglycerides.

The organic wax may be a paraffin.

The polyethylene wax useful in the present invention is a waxy solid having a melting point range of between 55°. and 85° C. preferably between 60° and 70° C. The polyethylene wax is a LOPE. The polyethylene may contain a wax soluble polymer. In the prior art the thermoset polymer is a polyurethane.

After the last layer of ISO/CS is added and is in the later stage of curing, a high melt microcrystalline wax is added to the product. The high-melt wax starts as a solid. The wax is heated to a temperature of about 200.degree. F. in a melting tank at which points it becomes a liquid. The high-melt microcrystalline wax is then sprayed on to later stage of curing of the polyurethane coated fertilizer substrate. The wax becomes solid again and "set" at about 181.degree. F. Since the fertilizer bed is about 160-165.degree. F., the wax will rapidly encapsulate the coated fertilizer substrate and harden.

Using the high-melt microcrystalline wax allows the product to be released from the coating vessel and put directly into bulk storage bins without going through an additional cooling step that other CRF technologies must go through when being manufactured.

An optional step in the prior art invention process is the optional addition of a bio stimulant. During the addition of the high-melt microcrystalline wax, a bio stimulant may also be added to the coated fertilizer substrate. This bio stimulant can be added and mixed thoroughly into the wax melting tank. By applying the bio stimulant with the wax simultaneously, it can be ensured that each coated particle is carrying the biostimulant.

Background Legality of Hemp and Hemp Biomass as a Cellulose Source

Industrial hemp is considered any part of the cannabis plant with no more than 0.3 percent of tetrahydrocannabinol (THC) on a dry weight basis. Farm Bill Sec. 10113 (amending 7 U.S.C. 1621 et seq.). Section 12619 of the Farm Bill formally removes industrial hemp-derived products from Schedule I status under the Controlled Substances Act, including cannabidiol (CBD) extracted from industrial hemp. CBD is extracted from the stalk, leaves, seeds, and flowers of industrial hemp leaving behind a biomass waste high in cellulose. This waste can be used for extracting cellulose microfibers and nanocrystals for further processing. Cellulose is a biodegradable chain of glucose subunits.

It is known that plant-based cellulose such as cellulose from hemp is biodegradable.

As cited in scholarly articles such as "Fabrication and mechanical properties of completely biodegradable hemp fiber reinforced polylactic acid composites" R Hu, JKLim— Journal of Composite Materials, 2007—journals.sagepub-.com . . . "Because of its good biodegradability in meeting the waste treatment requirements, it (hemp cellulose) was used." (biodegradable polylactide film).

Cellulose is the most abundant organic polymer found on Earth and is a fundamental part of the cell walls of plants and many species of algae. Although cellulose is primarily used to make paper, it is also used to make a range of different plastics including celluloid, cellophane, and rayon.

When plastics were first produced, they were all composed of organic, non-synthetic materials, and cellulose at that time was a fundamental part of the fledging plastics industry.

Now, renewed interest is being paid to bioplastics for their various environmental advantages.

Cellulose is a long-chain polysaccharide with the chemical formula ($C_6H_{10}O_5$) in that consists of hundreds or thousands of linked glucose units. It forms microfibrils (tiny, fiber-like strands) in the cell walls of plants, and adopts several different crystalline forms, although its natural form is made up of crystalline sections along with some amorphous sections.

Cellophane and rayon are both classified as regenerated cellulose fibers, as they are structurally identical to cellulose. They are produced similarly: cellulose is dissolved in an alkali solution and extruded through a slit into a bath of sulphuric acid to make cellophane film, or through a spinneret to make rayon fiber.

Celluloid is created by first producing nitrocellulose (cellulose nitrate) and then adding camphor, a widely used plasticizer, to produce a dense, solid thermoplastic that can be easily molded when heated.

Hemp cellulose can be extracted and used to make cellophane, rayon, celluloid, and a range of related plastics. Hemp is known to contain around 65-70% cellulose, and is considered a good source (wood contains around 40%, flax 65-75%, and cotton up to 90%) that has particular promise due to its relative sustainability and low environmental impact.

Hemp is faster-growing than most tree species and requires fewer pesticides than cotton or flax—although it does require significant fertilizer in some soils and has relatively high-water requirements.

Cellulose can be extracted from hemp and other fiber crops in various ways. The raw pulp can be hydrolyzed (separated into its component parts through addition of water) at 50-90° C.; it can also be soaked in a weak acid solution to separate the crystalline sections from the amorphous sections, to produce nanocrystalline cellulose.

It can be further subjected to heat and pressure to produce a form known as nanocellulose—a "pseudo-plastic" that appears gel-like and viscous in normal conditions but becomes more liquid when shaken or subjected to stress. Nanocellulose has a range of potential applications, as a composite plastic reinforcing material, as a super-absorbent to clean up oil spills or make hygiene products. Discarded hemp waste after CBD extraction can come in many forms. The most desirable form includes fibrous stalks, as the stalks can contain up to 45-70% of cellulose by weight.

An object of the present invention is to develop a biodegradable polymer coating from a biodegradable material such as, for example, hemp cellulose instead of the polyurethane coatings taught in the '707 patent.

It is an object of the present invention to provide a porous hemp-derived cellulosic material which can be useful to coat plant nutrient materials to form a new form of biodegradable controlled release fertilizers.

It is an object of the present invention to provide a novel method of replacing the petrochemical derived polyurethane with polymers from plant-based sources of hemp cellulose or sugar cane cellulose or other plant-based cellulose.

It is an object of the present invention to replace polyurethane with cellulose. Cellulose is the most abundant organic polymer found on Earth and is a fundamental part of the cell walls of plants and many species of algae.

SUMMARY

The present invention provides biodegradable polymer encapsulated, slow-release fertilizer particles. The present invention comprises applying a porous biodegradable polymer onto said fertilizer particles. The applications of porous biodegradable polymer may be repeated to form the encapsulated fertilizer particles comprising up to about ten percent of said coating by weight. The present coating and coating method from plant-based cellulose is biodegradable in soil media.

In one embodiment of the present invention is a modification to the prior art processes noted above and hereby incorporated by reference hereto for producing a plant-based polymer coating to replace polyurethane encapsulated, fertilizer substrate (particles).

The modified process comprises applying a plant based polymer derived from plant-based cellulose, such as, for example, hemp based or sugar based cellulose in which a wax has been dispersed to replace the prior patented isocyanate reactive component that includes a polyol containing a polyethylene wax (curable sealant) to form a coating on the fertilizer particles and applying an isocyanate component onto said fertilizer particles and curing the coating and further comprising applying a high temperature point microcrystalline wax to the coated particles during the last stages of curing of the isocyanate-containing coating.

The present coated fertilizer can have a coating of up to about 30% by weight of wax.

The organic waxes are selected from the group consisting of petroleum waxes, synthetic waxes, microcrystalline wax such as those used in the '827 patent, natural waxes, and hydrogenated triglycerides.

The organic wax may be a paraffin.

The polyethylene wax useful in the present invention is a waxy solid having a melting point range of between 55°. and 85° C. preferably between 60° and 70° C. The polyethylene wax is a LOPE. The polyethylene may contain a wax soluble polymer. In the prior art the thermoset polymer is a polyurethane.

A non-limiting example of a high temperature microcrystalline wax useful in the present invention is MICROSERE@ 5890A. MICROSERE@ 5890A is a white, high-melt, microcrystalline wax that is used in a variety of applications. MICROSERE@ 5890A complies with the requirements for "Microcrystalline Wax" set by the United States Pharmacopeia (USP)/National Formulary (NF). MICROSERE@ 5890A.

In the later stage of curing, a high melt microcrystalline wax can be added to the product. The high-melt wax starts as a solid. The wax is heated to a temperature of about 200° F. in a melting tank at which points it becomes a liquid. The high-melt microcrystalline wax is then sprayed on to later stage of curing of the cellulosic coated fertilizer substrate. The wax becomes solid again.

Using the high-melt microcrystalline wax allows the product to be released from the coating vessel and put directly into bulk storage bins without going through an additional cooling step that other CRF technologies must go through when being manufactured.

An optional step in the prior art invention process is the optional addition of a bio stimulant. During the addition of the high-melt microcrystalline wax, a bio stimulant may also be added to the coated fertilizer substrate. This bio stimulant can be added and mixed thoroughly into the wax melting tank. By applying the bio stimulant with the wax simultaneously, it can be ensured that each coated particle is carrying the bio stimulant.

The particulate fertilizer used in the present invention is not critical with respect to the type and may be any known chemical fertilizer. Examples of the fertilizer include ammonium sulfate, ammonium chloride, ammonium nitrate, urea, potassium chloride, potassium sulfate, potassium nitrate, sodium nitrate, ammonium phosphate, potassium phosphate, calcium phosphate, and composite fertilizers thereof.

The present invention provides a process for optionally replacing polyurethane encapsulated, slow-release fertilizer particles.

The present invention relates to a controlled release fertilizer coating to optionally replace the prior art polyurethane coating.

The new coating is extracted from plant-based cellulose, such as hemp cellulose, sugar cane cellulose or other plant-based cellulose. The present plant-based polymer as extracted from plant-based cellulose may be more rapidly biodegrade in the soil media than polyurethane derived coating.

Further, the present plant-based polymer extract when using Florikan prior patented coating methods may optionally improve the prior art patented by Florikan which are of the polyurethane polymer coatings or polyolefin polymer coatings on controlled release fertilizers which has been used successfully in commercial agriculture.

The present plant-based extracts from hemp cellulose, sugar cane cellulose or other cellulose, offer an option of a plant based controlled release alternative for agricultural production.

The present novel controlled release fertilizer coatings are more biodegradable than the prior art coatings. The prior art patented by Florikan is a polyurethane polymer which has a molecular structure of a cross-linked polyol which has been proven to be suitable for nutrient controlled release in Florikan prior patents.

The cellulose extracted from hemp as an example are made up of CNC nanocrystals which are as well, after a certain chemical modification, are found to be a cross linked molecular structure similarly suitable for controlled release of nutrients.

The CNC are hydrophilic in nature which is desirable in the initial step of polymer coating; however, as Florikan applies surface physical (wilclay) or chemical ISO or ($CO_2$), the cross linked structure is modified in the patented process, to a micro porous membrane to meet various requirements, such as the development of high-performance nanocomposites, using hydrophobic polymer matrices.

Biodegradable Coating Development.

The casting of the CNC slurries is followed by a thermal treatment to form a stable coating which is then correlated to temperature, time, and the CNC size. The result is a coating like the Florikan polyurethane with a cross-link density, porosity, structure, and water permeability. The CNCs of controlled size and surface chemistry result in CNCs ability to measure water uptake. In the coating cure time, the temperature, the surface chemistry, and addition of calcium on both structure and water permeation rates in the CNC membranes was found to determine long-term stability of the coatings and results were similar to those in polyurethane measured nutrient release.

The CNC nanocrystals are dispersed in a low pH aqueous environment near freezing point (32° C.) and applied to the fertilizer prills, which have been pre-treated with a hydrophobic oil. Heating the prill drives thermal dehydration of the CNC crystal coating, which condenses the CNC nanocrystals to create a robust controlled release coating. The CNC/prill complex is neutralized with a base before complete dehydration of the coatings. The CNC studies match the desired release rates of Florikan polyurethane coated fertilizer. The CNC release as a coating of controlled release fertilizer was tested in distilled water in an incubator at 100 F measuring the conductivity of nutrient release over seven days comparing the release to that of the polyurethane.

The present controlled release fertilizer is an optional polymer derived from hemp-based cellulose. The relationship between controlled release of fertilizer nutrients and a CNC coating has not ever been previously reported.

DETAILED DESCRIPTION OF THE INVENTION

The present invention relates to a controlled release fertilizer wherein plant nutrient particles are coated with the biodegradable coating composition comprising a cellulose extracted from plant biomass which has a porous structures capable of releasing plant nutrients wherein said porous structure can be created after extraction of the plant biomass. The plant biomass is plant cellulose extracted from hemp cellulose, sugar cane cellulose, or other plant-based cellulose. The plant biomass can be plant cellulose extracted from hemp cellulose. In a preferred embodiment, the plant biomass is plant cellulose extracted from hemp cellulose having blended therein 5-30% by weight of wax. A porous structure can be created after extraction of the plant biomass.

The present invention further relates to a method of preparing a biodegradable controlled release plant fertilizer comprising applying at least one coating of a biodegradable polymer biomass having blended therein up to 30% by weight of wax onto said fertilizer particles and allowing the coating to set. The biomass is plant cellulose extracted from hemp cellulose, sugar cane cellulose, or other plant-based cellulose. The wax car petroleum waxes, synthetic waxes, microcrystalline.

In one embodiment, the present invention relates to a biodegradable polymer derived from a bi-product of NANO cellulose drawn from the hemp plant as well as plant nutrient particles coated with the biodegradable polymer derived from a bi-product of NANO cellulose.

The NANO cellulose has natural passages which result in a semi permeable membrane which is suited as a coating for nutrients to pass thru. The NANO cellulose release channels are a novel coating a biodegradable polymer drawn from the hemp plant.

The nutrients are released through the porous hemp-derived polymer. Porosity is created by the addition of calcium composites in the form of, for example wil-clay, added to the liquified hemp polymer which creates a physical release mechanism for nutrients to release by reverse osmosis. Nutrient passages in the hemp derived polymer can also be created by application of carbon dioxide ($CO_2$) as a gas into liquified hemp derived nano cellulose which also opens passages in the hemp cellulose. $CO_2$ can be applied to the polymer under elevated temperatures and high pressure in coating vessels. The biodegradable polymer derived from hemp has three mechanisms which have opened passages for nutrients diffusion thru a biodegradable polymer extracted from hemp.

The biodegradable polymer derived from hemp has three mechanisms which have opened passages for nutrients diffusion thru a biodegradable polymer extracted from hemp.

Hemp biomass as a recycled material can be used to provide biodegradable polymers. With the expansion of hemp growing production this polymer extraction from hemp cellulose is an important novel invention. The extracted cellulose hemp was examined under magnification in lab and found to have porosity and tensile strength for molecular structure natural passages for hemp. The extraction of polymer from hemp cellulose can use methods of extraction such as steam and acid to extract the biodegradable polymer from hemp. The extracted polymer from cellulose hemp is in a liquid polymer ready to use in coating of fertilizer nutrients. The liquid polymer extracted would be stored in tanks like how prior art urethane coatings are currently stored at the factory.

The release channels can be created post extraction of the hemp. Post polymer extraction the addition of physical means to create release channels such as calcium-wilclay or by a non-physical property such as a gaseous $CO_2$ which creates release channels in extracted material. This is important to provide a commercial product useful for nutrient coating.

The liquid polymer from hemp with created release channels can be applied to nutrients such as urea granules and sulphate of potash granules and micronutrient granules.

Target nutrient release of the biodegradable coating is a 60-90-day longevity in the agricultural production field. The coating thickness of the polymer derived from hemp may require multiple coating layers to obtain the desired plant nutrient release rate.

The multiple layers which would, in manufacturing, be subjected to QC release types checks of release matched against known and accepted conductivity targeting a 60-90 days finished product of nutrient release.

The present invention provides a cellulose polymer from hemp in nano crystal forms in a liquid cross-linked hemp which will successfully coat plant fertilizer nutrients such as urea 46-0-0 and NK 21-0-21 etc. with a hemp derived Plant based polymer which will be biodegradable in the soil after releasing the nutrients.

Biodegradable polymers on Fertilizer nutrients is novel and has never been done before.

In an embodiment of the present invention there is a changing by a chemical interaction of an impervious surface such as cellulose in a liquid form which is modified by an additive to a semi permeable surface membrane when applied to nutrients to permit a controlled release thru the coating by reverse osmosis.

The hemp bio extract would be received and applied in a liquid form to nutrients and then dried by heat in the coating process.

Passageways would be physically or chemically created in the coating on a manner like the prior Florikan process with polyurethane and ISO but with hemp to create the biodegradable coating.

An extracted cross-linked polymer from hemp cellulose to optionally replace the cross-linked polyurethane coating described in previous paragraph.

The present invention provides the option of replacing the polyurethane polymer or a polyolefin polymer with polymers extracted from hemp cellulose which are plant based as an option which, as plant based as a biodegradable polymer would degrade once nutrient diffusion is complete from the coated granules which were planted in the soil.

Steps to a biodegradable coating of controlled release fertilizer. The present invention for developing the option of replacing polyurethane coating with cellulose based coating confirmed the extracted cross-linked polymer from hemp cellulose was an impervious surface as compared to prior art of the polyurethane polymer coating.

In the present invention, it was found that by adding multiple layers of coating the release rate was controlled as compared to the prior art of polyurethane coating.

In the present invention, a method of porosity was created in the polymer by physical means such as wilclay (or Dolomite) or by the chemical means of ISO or $CO_2$ was the next step.

Comparative Testing Step Polyurethane Coating to Plant Based Cellulose Coating

An impervious surface was proven plus a measured porosity created, and then testing by adding the cellulose based coating to urea nitrogen fertilizer prills was accomplished. This final comparative testing step measured the release mechanism of the plant-based biodegradable coating results which were measured against the prior art of polyurethane 30-60-day release (called YLD).

The present invention comprises the following steps to achieve the plant based cellulose coating 1) A polymer coating known as BTR, a Florikan™, is extracted from hemp cellulose.
A wax in amounts from 5-30 by weight is dispersed in the extract coating
(2) Nutrient Release mechanisms are perfected by optionally adding specific amounts of wilclay (physical) or by chemical means (ISO)
(3) Release rate is measured by adding layers of the polymer and by adding waxes as described to the prill to protect against rapid release using either polyurethane wax as used currently.
(4) Applications of the present polymer were made to urea in lab drum in layers.

The release was then measured in an incubator and compared to prior art called YLD short term release coated in prior patent on polyurethane coated urea.

Cross Linking Plant-Based Cellulose.

The cross linking of the hemp cellulose polymer is like the cross linking of the current polymer of polyurethane coating structure. A cross linked polymer from hemp cellulose which would be biodegradable would be significant once obtaining permeability data has been that the films continue to cure (and shrink) during the permeability studies.

To create the cross-linking, glutaraldehyde added to the nano cellulose is used as a crosslinker to both crosslink the cellulose film which assists with the time of curing) and to enhance the water vapor barrier property.

The mechanism of crosslinking of cellulose with glutaraldehyde eliminates water absorbing —OH groups.

To have the slurry more easily wet a hydrophobic wax as used in YLD process was found to reduce interfacial tension between the slurry and the hydrophobic coating. It can also be optionally simultaneously cross-linked with epichlorohydrin. The coatings were also exposed to butyric anhydride to make them more hydrophobic.

The co-precipitating of the cellulose slurry with a wax slurry enhanced water barrier property. The inclusion of a higher fraction of lignin in the cellulose component after extraction from hemp also improved the coating surface.

Steps taken to form a biodegradable polymer coating on controlled release fertilizer.

Preparation of the hemp cellulose with measured CNC cellulose nanocrystals which is used as a polymer coating of controlled release fertilizer. Depending on the source, the hemp byproduct contains varying amounts of cellulose. In the lab an aqueous slurry of crystalline cellulose nanoparticles was produced followed by application of the slurry as a coating with controlled release fertilizer properties.

Characterization and Cellulose Extraction. Establishing baselines for treatment of hemp were developed for the uniform production of CNC cellulose nanocrystals.

The CNC coatings were developed into a pH neutral suspension of CNCs to be further processed into coatings. CNC are cellulose nanocrystals which are a unique nanomaterial derived from the most abundant and almost inexhaustible natural polymer, cellulose. Cellulose nanocrystals CNC primarily obtained from naturally occurring cellulose fibers are biodegradable and renewable in nature and hence they serve as a sustainable and environmentally sustainable material for coating of controlled release fertilizer applications.

The CNC nanocrystals are basically hydrophilic in nature; however, as we applied surface physical (wilclay) or chemical ISO or ($CO_2$) functionalization is created with micro porous membrane to meet various re requirements, such as the development of high-performance nanocomposites, using hydrophobic polymer matrices.

Coating Development Casting of the CNC slurries was followed by a thermal treatment to condense the hydroxy (OH) groups to form a more stable coating correlated to temperature, time, and the CNC size.

The result is a coating like polyurethane with cross-link density, porosity, structure, and water permeability. The relationship between controlled release of fertilizer nutrients and a CNC coating has not ever been previously reported. The CNCs of a controlled size and surface chemistry result in CNCs anisotropic and therefore offer the ability to a measure water uptake.

Water permeation was measured in the plant-based polymer compared to polyurethane.

The plant-based polymer is susceptible to the structure and tightness of the CNC. In the coating cure time, the temperature, the surface chemistry, on both structure and water permeation rates in the CNC membranes was found to accurately determine long-term stability of the coatings when compared to prior art polyurethane coating as patented by Florikan.

Results of nutrient release from plant-based cellulose were like nutrient release from prior art polyurethane measured nutrient release.

The CNC studies of optionally cross-linked plant-based cellulose having a wax dispersed in the coating matched the desired release rates of prior art patented by Florikan exhibited from polyurethane coated fertilizer.

It was found that blending into the hemp cellulose wax or microcrystalline wax in an amount from 5-30%, preferably 5-20% with the cellulose extracted produced the best controlled release fertilizer results. The blended samples with each had the lowest release rate of urea (0.1 and 0.2%) after 24 hours.

The ones with the cellulose coating (non-blended) had 10% release after 24 hours.

After the CNC cross linked release as a coating of controlled release fertilizer was tested in distilled water in incubator at 100° F. measuring conductivity of nutrient release over seven days comparing to the prior art polyurethane Florikan controlled release fertilizer, it was confirmed the development of the new cross linked polymer derived from hemp based cellulose had similar nutrient release for agricultural use.

Method coating steps heated drum.

Step 1

Wax applied first as used in YLD same polyethylene wax.

Step 2

Cross linked Cellulose in same coating weights and applications as in YLD (up to 6% coating weight target 60-day release).

Step 3

Wax sealant last same wax as used in YLD patent technology.

The wax on recipe then the biodegradable polymer coating derived from hemp cellulose followed by the second wax produces a controlled release fertilizer coating.

Looks good so far linear release permeability of the biodegradable polymer coating derived from hemp cellulose is in line with YLD to be 60-90-day release.

Method coating steps heated drum.

Step 1

Wax applied first as used in YLD same polyethylene wax.

Step 2

Cross linked Cellulose in same coating weights and applications as in YLD (up to 6% coating weight target 60-day release).

Step 3

Wax sealant last same wax as used in YLD patent technology.

Hemp Coating on Urea—Jun. 10, 2020

| | Procedure |
|---|---|
| 1. | Start heating the drum. |
| 2. | Place 667 g of Ag grade urea-note the SGN. |
| 3. | Wait till temp 200° F.-rotating at low RPM-note RPM. |
| 4. | Melt wax on hot plate. |
| 5. | Add 6.67 g wax and coat for 3 minutes. |
| 6. | Add 6.67 g wax and coat for 3 minutes. |
| 7. | Add 6.67 g wax and coat for 3 minutes = Total 3% cw to this point. |
| 8. | Cool drum down to 155° F. |
| 9. | Add 667 ml of the solution/slurry/hemp cellulosic provided by USF. |
| 1a. | Continue this operation for 4 hrs.-make any observations-longer time if required will a relatively dry film is obtained = Total 8% cw to this point. |
| 11. | Wash the material in the drum with 10 ml of washing solution (5% sulfuric acid). |
| 12. | Wait 10 minutes for washing solution to evaporate. |
| 13. | Melt wax on hot plate. |
| 14. | Add 6.67 g wax and coat for 3 minutes. |
| 15. | Add 6.67 g wax and coat for 3 minutes. |
| 16. | Add 6.67 g wax and coat for 3 minutes = Total of 11% cw to this point. |
| 17. | Cool drum down to ~120° F. |
| 18. | Take large sonic and HT test. |

Hemp Biomass Derived Coatings:

Procedures for Florikan Cellulose extraction from Hemp Biomass:

1. Hemp biomass first ground with the use of a food blender.
2. 5.0 grams of ground biomass were added to 300 ml DI-water (0.016 mg/ml) and sonicated for 30 mins.
3. After sonication, the biomass was bleached to remove the non-cellulosic materials including lignin. The sonicated biomass was first filtered and transferred into 100 ml 5 wt % NaOH aqueous solution at 55° C.
4. While stirring, a 100 ml 11% v/v hydrogen peroxide (50% hydrogen) peroxide solution was added to the solution drop by drop over a thirty-minute period. The reaction continued for another 90 mins after adding all the hydrogen peroxide solution.
5. The slurry was filtered out after bleaching, and this process was repeated three times to ensure complete removal of lignin and non-cellulosic component.
6. The filtered-out product was soaked in 7.5 wt % $H_2O_2$ solution at 65° C. for hours without stirring. After these four treatments, the residuals were filtered and washed with DI-water and dried at 50° C.

Final product was sonicated to break down crystals into microcrystalline Cellulose Coating Development:

1. 4.5 wt % microcrystalline cellulose first mixed in a Jul. 12, 1989 wt. % NaOH/Urea/Water solution
2. The mixture was stored in −20° C. for at least 24 hours before using.
3. The frozen mixture was thawed under room temperature with stirring.
4. After the mixture was completely thawed, the solution was transferred into centrifuge tube and c centrifuged for 10 mins at 4000 rpm to degasify.
5. The degasified solution was poured into petri dish and put into 80° C. oven for 1 hour.
6. The gel-like film was immersed into a 5 wt % sulfuric acid solution to regenerate cellulose for 10 minutes.
7. The regenerated cellulose film was washed with DI-water until the pH became neutral.

Wet film was dried between two silicone wafers and pressed with weight to prevent shrinkage at room temperature.

Comparison of Water Permeability of USF to Florikan Membrane

DETAILED DESCRIPTION

Figure 1:
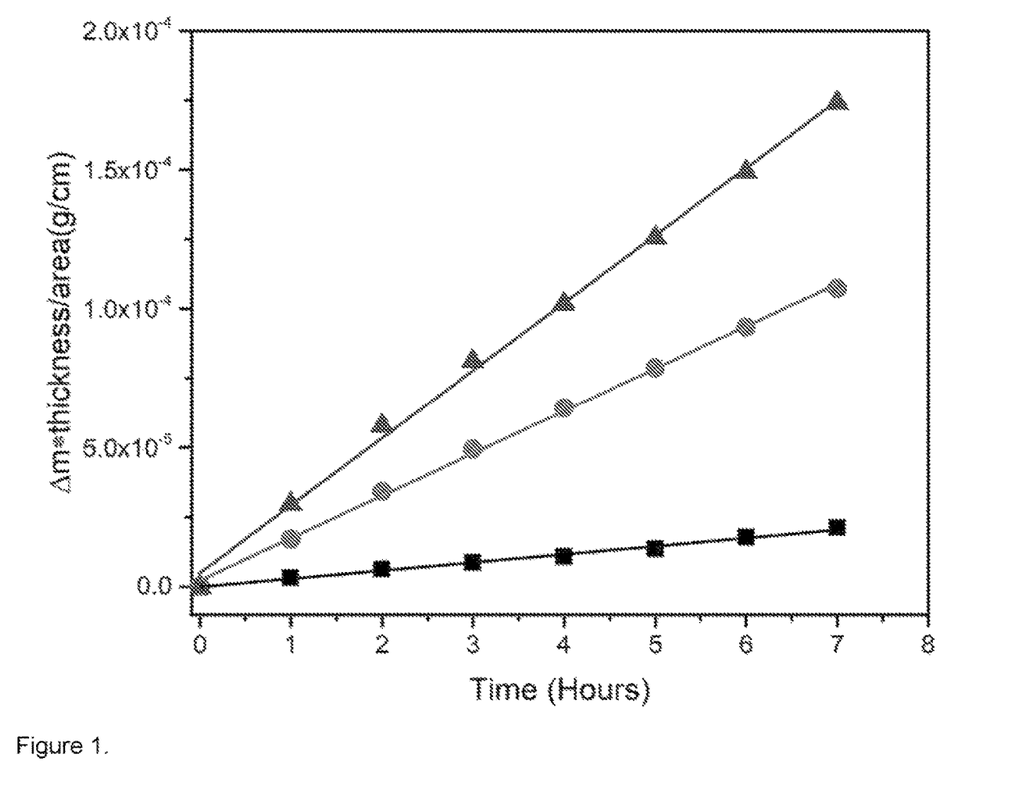
FIG. 1 shows the water vapor permeability test data and fitting for the regenerated cellulose films and Florikan samples. Thickness: Florikan Sample 1 (~1100 μm); 4.5 wt % uncrosslinked regenerated cellulose film: 110 μm; 6 wt % crosslinked cellulose film: 150 μm.

FIG. 1, the black square represents the Florikan Sample; the Red Circle represents 4.5% uncrosslinked-rc; the blue triangle represents 6% Crosslinked-RC; the black line represents Florikan Fit: 2.92E-6*x−5.78E-8; the Red line represents 4.5% UCL-RC Fit: 1.52E-5*x+2.17E-6; and the Blue line represents 6% CL-RC Fit: 2.43E-5*x+4.89E-6.

Figure 2:
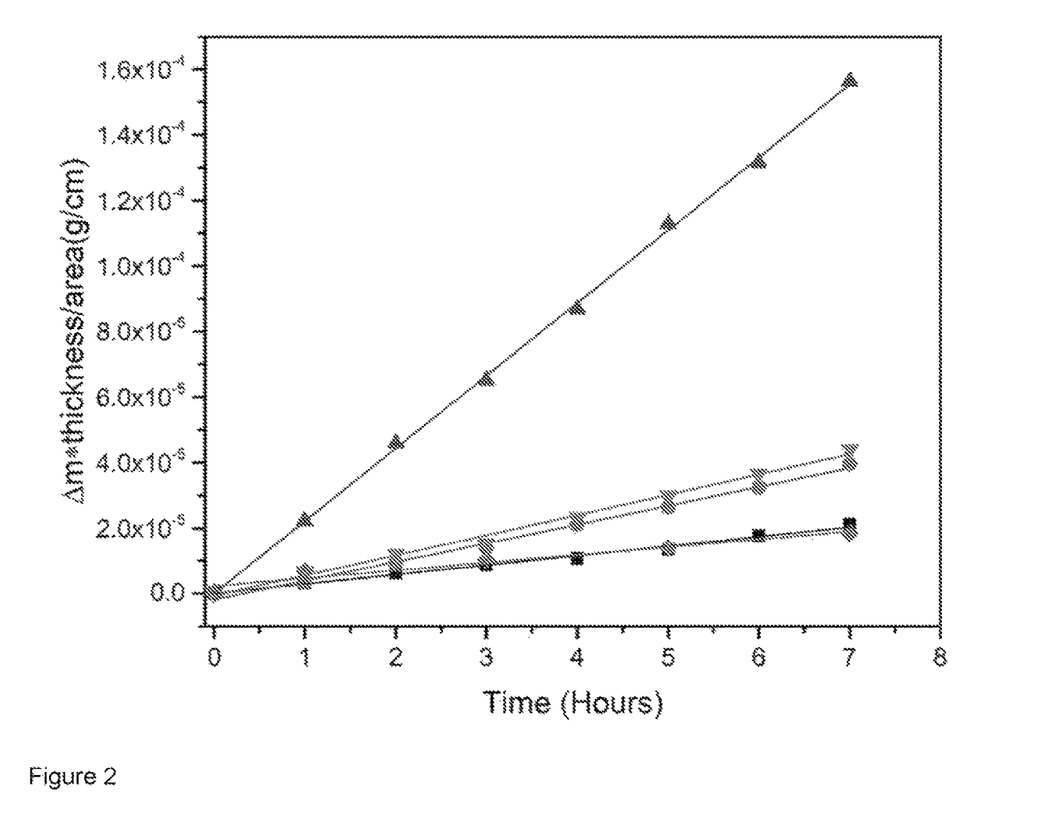
FIG. 2 shows a comparison of the water vapor permeability test data and fitting for all Florikan samples.

In FIG. 2, the black square represents Florikan 1st Sample; the Red Circle represents control sample 1; the Blue Triangle represents Control sample 2; the Pink Upside Down Triangle represents Control sample 3; the represents Green Diamond: Control sample 4; the Black Line represents 2.92E-6*x−5.78E-8; the Red line represents 5.74E-6*x−1.82E-6; the Blue line represents 2.22E-5*x−6.77E-20; the Pink line represents 6.18E-6*x+6.66E-7; and the Green line represents 2.41E-6*x+2.22E-6.

While this invention has been disclosed with reference to specific embodiments, it is apparent that other embodiments and variations of this invention may be devised by others skilled in the art without departing from the true spirit and scope of the invention. the appended claims are intended to be construed to include all such embodiments and equivalent variations.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A controlled release fertilizer comprising:
   a core including plant nutrient particles; and
   a biodegradable coating composition forming at least one layer surrounding the core, the composition comprising cellulose, the at least one layer being structured as a semi-permeable surface membrane configured to release the plant nutrients from the core in a linear manner, the biodegradable coating composition further comprising calcium composites or carbon dioxide gas.

2. The fertilizer of claim 1, wherein the biodegradable coating composition further includes about up to 30 wt. % wax.

3. The fertilizer of claim 2, wherein the wax is a natural wax.

4. The fertilizer of claim 1 further comprising an outermost layer including a high temperature point microcrystalline wax.

5. The fertilizer of claim 1, wherein the plant nutrient particles include urea.

6. A biodegradable fertilizer comprising:
   a nutrient substrate encapsulated in a cellulosic coating including a plant-based cellulose and having a micro-porous structure including release channels arranged to release nutrients from the substrate in a controlled manner, the substrate and the cellulosic coating being biodegradable, wherein the micro-porous structure includes calcium composites or carbon dioxide gas.

7. The fertilizer of claim 6, wherein the nutrient substrate includes a biostimulant.

8. The fertilizer of claim 6, wherein the nutrient substrate includes urea.

9. The fertilizer of claim 6, wherein the plant-based cellulose includes hemp cellulose.

10. The fertilizer of claim 6, wherein the cellulosic coating is a multi-layer coating.

11. The fertilizer of claim 6, wherein the cellulosic coating includes a mixture of cellulose and wax.

12. A controlled release fertilizer comprising:
    nutrient particles, each enclosed in a cellulose-based semi-permeable biodegradable coating, the nutrient particles being structured to diffuse from the fertilizer via the coating, the biodegradable coating structured to degrade after diffusion of the nutrients is complete, the biodegradable coating further comprising calcium composites or carbon dioxide gas.

13. The fertilizer of claim 12, wherein the biodegradable coating is a multi-layer coating.

14. The fertilizer of claim 13, wherein each layer of the multi-layer coating includes cellulose.

15. The fertilizer of claim 12, wherein the biodegradable coating includes diffusion channels.

16. The fertilizer of claim 12, wherein the cellulose-based coating includes a wax blended with cellulose.

17. The fertilizer of claim 12, wherein the cellulose-based coating includes plant-based cellulose.

18. A controlled release fertilizer comprising:
    a nutrient core; and
    a cellulose coating composition forming at least one semi-permeable surface membrane having a micro-porous structure to release the nutrients from the core in a predetermined manner, the cellulose coating composition comprising calcium composites or carbon dioxide gas.

19. The controlled release fertilizer of claim 18, wherein the micro-porous structure includes the calcium composites.

20. The controlled release fertilizer of claim 18, wherein the cellulose-based coating includes plant-based cellulose.

21. The controlled release fertilizer of claim 18, wherein the cellulose-based coating includes a wax blended with cellulose.

* * * * *